Aug. 11, 1964     R. B. THORNE ETAL     3,144,255
SEALING MEANS UTILIZING LEAF MEMBERS

Filed July 14, 1961     2 Sheets-Sheet 1

INVENTORS.
ROBERT B. THORNE
WILLIAM GALL
BY

Gerald L. Moore

ATTORNEY—

Aug. 11, 1964   R. B. THORNE ETAL   3,144,255
SEALING MEANS UTILIZING LEAF MEMBERS
Filed July 14, 1961   2 Sheets-Sheet 2
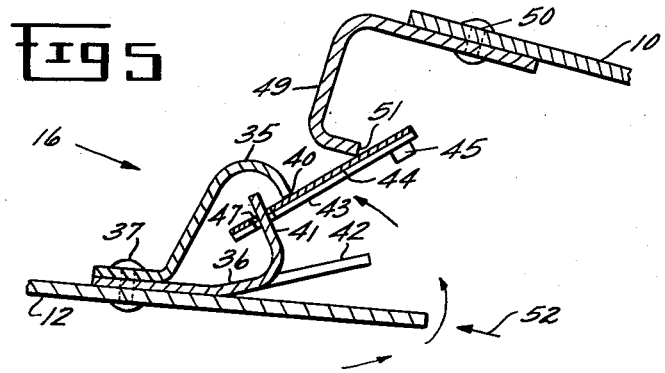
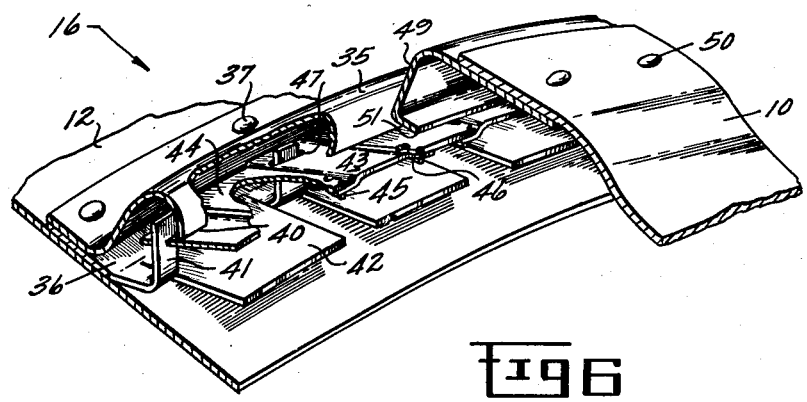
INVENTORS.
ROBERT B. THORNE
WILLIAM GALL
BY
Herald L. Moore
ATTORNEY—

United States Patent Office 3,144,255
Patented Aug. 11, 1964

3,144,255
SEALING MEANS UTILIZING LEAF MEMBERS
Robert B. Thorne, Johnson City, N.Y., and William Gall, Cincinnati, Ohio, assignors to General Electric Company, a corporation of New York
Filed July 14, 1961, Ser. No. 124,222
5 Claims. (Cl. 277—173)

The present invention relates to sealing means, and more particularly, to a sealing means that is designed to provide an effective seal for joints subjected to high pressures and temperatures.

In many applications, and particularly in turbojet engines, it is necessary to seal joints which are exposed to high temperature and high pressure fluids. Frequently, these joints are of circular and irregular shapes and are subject to distortion due to these high temperatures and pressures thereby necessitating the sealing means to allow for movement between the members forming the joint. In addition, such sealing means must be capable of recycling, i.e., repeated sealing and unsealing, when utilized between relatively movable members; they must provide a long, useful life under these adverse conditions and yet be readily replaceable in event of wear or damage.

It is therefore one object of this invention to provide new and improved sealing means which will withsand high pressures and temperatures, It is another object of this invention to provide new and improved sealing means which will compensate for distortion between the joint members, It is a further object of this invention to provide a new and improved recycling type sealing means which may be employed in joints of irregular shapes.

Briefly stated, in accordance with one modification of the invention, a sealing means is provided comprising a wall means attached to each joint member with a seating surface on the high pressure side of the joint members. A plurality of abutting or overlapping leaf members are positioned to extend across the joint opening between the wall member seating surfaces to form a substantially continuous wall and prevent fluid passage through the joint. These leaf members are supported by a mounting means which allows the individual leaf members to move into contact with the wall seating surfaces for sealing the joint irrespective of irregularities in shape of the joint members or distortion thereof. The leaf members are seated and maintained in the sealing position by the high pressure fluid acting against them to force them tightly against the wall means.

The subject matter which is regarded as the invention is particularly pointed out and distinctly claimed in the concluding portion of this specification. The invention, however, both as to organization and method of operation together with further objects and advantages thereof may best be understood by reference to the following description taken in connection with the accompanying drawings, in which:

FIGURE 5 is a cross-sectional view of another modification of the seal structure; and FIGURE 6 is a perspective view of the seal structure of FIGURE 5.

Figure 1:
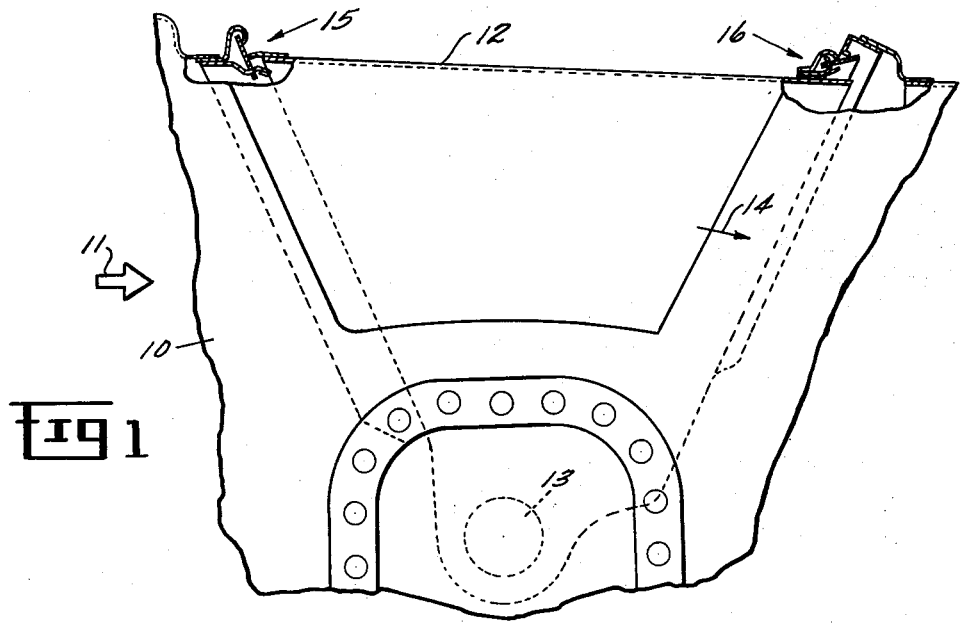
FIGURE 1 illustrates one application of the subject invention, to joint seals between the blocker doors and exhaust nozzle of an aircraft turbojet engine.

Referring now to FIGURE 1, there is illustrated a partial side view of a tourbojet engine exhaust nozzle embodying the present invention consisting of the exhaust nozzle wall 10 through which the exhaust gases from a turbojet engine flow in the direction indicated by the arrow 11. A thrust reverser blocker door 12 is illustrated in the forward thrust or stored position flush with the exhaust nozzle wall 10. The blocker door is supported from a pivotal support 13. When reverse thrust of the turbojet is desired the blocker door is pivoted in clockwise direction as indicated by the arrow 14 across one-half of the exhaust flow, where it abuts a similar door (not shown) pivoting in the same manner (in counterclockwise direction) from the other side of the exhaust nozzle. These doors serve to reverse the exhaust gas flow by blocking the flow and forcing it to pass out through the opening in the exhaust nozzle wall which is closed by them when in the forward thrust position.

When the blocker doors 12 are in the forward thrust position as illustrated, it is desirable to seal the joints between the doors and the exhaust nozzle wall 10 to prevent exhaust gases from escaping outwardly through these joints, since any exhaust gas leakage might cause a significant loss of thrust and possibly result in heating the door actuator control. Seal structures 15 and 16 are utilized to seal these joints in accordance with the invention as will be pointed out more fully hereinafter. It can be seen that these seal members are subjected to the high temperatures and pressures of the exhaust gases flowing through the exhaust nozzle 10 and also must be cycled periodically when the blocker door 12 is actuated to the reverse thrust position.

Figure 2:
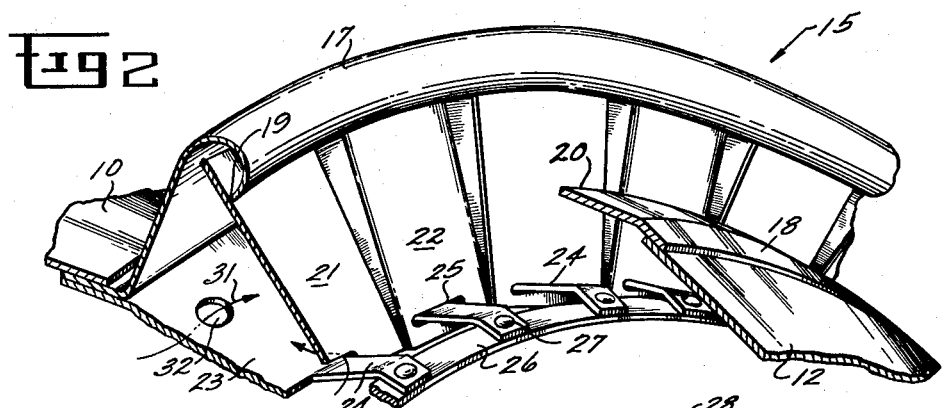
FIGURE 2 is a perspective view showing in detail one of the two joint seals of FIGURE 1.
Figure 3:
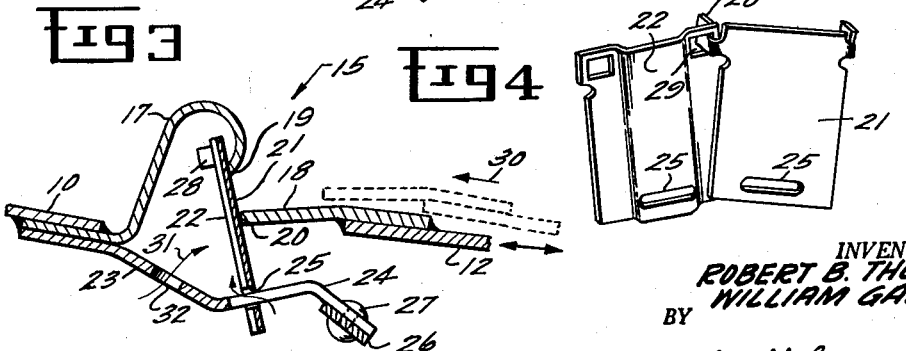
FIGURE 3 is a cross-sectional view of the seal structure of FIGURE 2.
Figure 4:
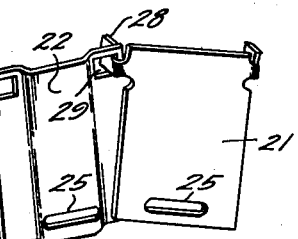
FIGURE 4 illustrates the interlocking leaf members.

Referring now more particularly to the seal structure of the present invention as illustrated in FIGURES 2, 3 and 4, there is shown a portion of the exhaust nozzle wall 10 and the blocker door 12 with the seal structure of the present invention sealing the joint therebetween when the blocker door is in the forward thrust position. A seal seating member 17 is attached to the exhaust nozzle wall 10 and extends around a portion of the joint while a second seal seating member 18 is attached to the blocker door 12 in a similar manner. These seating members 17 and 18 are formed to provide seating surfaces 19 and 20 which extend toward the center or high pressure interior of the exhaust nozzle. The seal itself consists of a plurality of leaf members or segments 21 and 22 of a length sufficient to span the opening between the seating surfaces 19 and 20 and of a breadth sufficient for the edges to abut or overlap the adjacent leaf members as illustrated to provide a substantially continuous wall structure extending across the joint opening.

The seal segments 21 and 22 are supported on the high pressure side of the seal seating member 17 by a support member 23 having projections 24 which extend through openings 25 in the individual leaf members to loosely maintain the leaf members adjacent the seal seating member 17 so as to allow translatory and sliding movement of the leaf members laterally with respect to the seal seating member. The support member 23 is attached to the exhaust nozzle wall 10 by any suitable means, i.e., by bolting or welding.

A lateral support member 26 is provided for aligning and providing lateral support to the projections 24 and is attached to the extremities of these support projections as by rivets 27. This member 26 is attached to the projections 24 after the leaf members 21 and 22 are mounted thereon and additionally serves to retain the leaf members in the support structure when exposed to high velocity exhaust gas.

The leaf members may be of any configuration provided that when assembled they form a substantially continuous sealing wall and members 21 are shown in FIGURE 4 as having an offset configuration to allow for close positioning adjacent the seating surfaces 19 and 20. To maintain the unsupported ends of the segments opposite the opening 25 in alignment a tab 28 is formed integral with the leaf member 21 which extends normal to the seal leaf member 21 and, when the seal is assembled, passes through an opening 29 in the adjacent seal leaf member 22 to maintain the seal ends in an overlapping relationship and assure continuity of the seal. This tab 28 is formed with an enlarged tip which will pass through the opening 29 only when the leaf members are rotated with respect to one another such that the tip passes diagonally through the opening 29. This assures that the tab 28 remains in the opening 29 when the leaf members are rotated back to their normal side-by-side position since the tab will not pass back through the opening when in this position. It will be noted that since tabs 28 and openings 29 do not lie between the sealing surfaces 19 and 20 when the leaf members are in sealing position, there is no pressure difference across these openings and accordingly no necessity to seal against leakage through them. In the same manner, the openings 25 and projections 24 are outside the seating surface 19 and do not require sealing to prevent leakage therethrough.

In considering the operation of this sealing means, when the blocker door 12 is moved to the forward thrust position the seal seating member 18 attached to the door is moved as indicated by the arrow 30 (FIGURE 3) from the position shown in dotted lines to the position illustrated in solid lines, wherein its seating surface 20 abuts the seal segments 21 and 22. Pressure fluid within the exhaust nozzle 10 passes through the opening 32 as indicated by the arrow 31 and forces the individual seal segments 21 and 22 tightly against the seating surfaces 19 and 20 to seal the joint between the blocker door assembly and the exhaust nozzle. In addition, openings 25 also provide for free flow of the pressure fluid against the seal segments. It can thus be seen that a sealing means which may be metallic or any material able to withstand the desired pressures and temperatures is provided which may be recycled numerous times with equal sealing effectiveness during each cycling. In addition, due to the length of the seal segment surface against which the seating surface 20 may bear, distortion between the exhaust nozzle wall 10 and the blocker 12 is allowable with equal sealing results. Also, since the seal wall is comprised of segments of small breadth, the wall may distort to abut various irregular seating surfaces to effectively seal various types of irregular joints in an equally efficient manner.

A modification of the sealing means is also illustrated generally in FIGURE 1 as seal structure 16 sealing the joint between the blocker door 12 and the exhaust nozzle wall 10 when the blocker door is in the forward thrust position. The joint members approach each other in closing in a different manner in this joint necessitating a modification of the sealing means seating structure. As illustrated in enlarged detail in FIGURES 5 and 6, a seal seating member 35 and a seal support member 36 are attached to the blocker door 12 by suitable means such as rivets 37. The seal seating member 35 is formed to provide a seal seating surface 40 facing towards the high pressure side of the blocker door.

On the unsupported side of the seal support member 36 are formed individual projections 41 which are bent in a direction toward the seal seating member 35 while portions 42 extend straight and form a seal guard. The seal itself comprises seal leaf members or segments 43 and 44 which are similar to those described in the previous embodiment with locking tabs 45 interfitting in holes 46 in the adjacent segments to maintain the ends of the segments in alignment. Also, segments 43 have an offset configuration to allow the segments to interfit closely against adjacent segments and the seal seating surfaces.

In this embodiment, the alternating segments 43 have a mounting hole 47 therein through which the projection 41 extends to maintain the seal adjacent the seating member 35. After the seal segments 43 are placed over the projections 41 the projections may be bent towards the seating member 35 sufficiently to prevent the segments from coming loose therefrom. The alternate segments 44 are maintained in position by the locking tabs 45 which interlock the segments 43 and 44 in an overlapping manner to form a continuous sealing wall. A seal seating member 49 is attached to the exhaust nozzle wall 10 adjacent the joint with the method of attachment being any suitable means such as rivets 50. The seal seating member 49 is formed to provide a sealing surface 51 facing the high pressure side of the wall 10 adjacent the seating surface 40 when the blocker door is in the forward thrust position. As explained previously, when the blocker door is moved in a direction counterclockwise from this forward thrust position, as indicated by the arrow 52, the sealing segments 43 and 44 will contact the seating surface 51 and thereafter be forced against the seating surface 40 by the force of the pressure fluid within the exhaust nozzle acting against the segments to close the joint by forming a substantially continuous sealing member extending across the joint in the same advantageous manner as in the first embodiment.

Although the above-described embodiments disclose the invention as applied to a turbojet engine it is to be understood that the invention may be employed in an equally advantageous manner anywhere where high temperatures and pressures are encountered. While there have been described what are present considered the preferred embodiments of this invention, it will be obvious to those skilled in the art that many changes and modifications may be made therein without departing from the invention, and it is, therefore, intended to cover in the appended claims all such changes and modifications as fall within the true spirit and scope of the invention.

What is claimed is:

1. For use in sealing a wall opening against fluid leakage therethrough due to higher fluid pressure on one side of the wall than on the other, fluid seal structure comprising wall means defining said opening and further defining seal seating surfaces disposed in surrounding relation to said opening and facing in the direction of the higher fluid pressure, a plurality of leaf members each being of length sufficient to span said opening and engage said seal seating surfaces and being of breadth such that the edge portions of adjoining leaf members contact to form a substantially continuous seal member, and a plurality of support members carried by said wall means adjacent said seal seating surfaces each independently mounting one of said leaf members for sliding movement bodily into engagement with said seal seating surfaces responsive to the fluid pressure on opposite sides of the wall.

2. For use in sealing a wall opening against fluid leakage therethrough due to higher fluid pressure on one side of the wall than on the other, fluid seal structure comprising wall means defining said opening and further defining seal seating surfaces disposed in surrounding relation to said opening and facing in the direction of the higher fluid pressure, a plurality of leaf members each being of length sufficient to span said opening and engage said seal seating surfaces and being of breadth such that the edge portions of adjoining leaf members contact to form a substantially continuous seal member, means carried by said adjoining leaf members operative to interlock them together, and a plurality of support members carried by said wall means adjacent said seal seating surfaces to mount said seal member adjacent said seating surfaces for movement into engagement with said seating surfaces responsive to the fluid pressure on opposite sides of the wall.

3. For use in sealing a wall opening against fluid leakage therethrough due to a higher fluid pressure on one side of the wall than on the other, fluid seal structure comprising wall means defining said opening and further defining seal seating surfaces disposed in surrounding relation to said opening and facing in the direction of the higher fluid pressure, a plurality of leaf members each being of length sufficient to span said opening and engage said seal seating surfaces and being of breadth such that the edge portions of adjoining leaf members overlap to form a substantially continuous seal member, interlocking means to interlock the adjoining leaf members, said seal member having a plurality of holes therethrough, and a support means carried by said wall means comprising a plurality of projections extending through said holes to mount said seal member for sliding movement into engagement with said seating surfaces responsive to the fluid pressure on opposite sides of the wall.

4. For use in sealing a wall opening against fluid leakage therethrough due to higher fluid pressure on one side of the wall than on the other, fluid seal structure comprising wall means defining said opening and further defining seal seating surfaces disposed in surrounding relation to said opening and facing in the direction of the higher fluid pressure, a plurality of leaf members each being of a length sufficient to span said opening and engage said seal seating surfaces and being of a breadth such that the edge portions of adjoining leaf members contact to form a substantially continuous seal member, means carried by said adjoining leaf members operative to interlock them together, said means including a tab with an enlarged head on alternate leaf members with the remaining leaf members having openings therein to interlock with said tabs, said seal member having a plurality of holes therethrough, and a support means carried by said wall means comprising a plurality of projections extending through said holes to mount said seal member for sliding movement into engagement with said seating surfaces responsive to the fluid pressure on opposite sides of the wall.

5. For use in sealing a wall opening against fluid leakage therethrough due to higher fluid pressure on one side of the wall than on the other, fluid seal structure comprising wall means defining said opening and further defining seal seating surfaces disposed in surrounding relation to said opening and facing in the direction of the higher fluid pressure, a plurality of leaf members each being of length sufficient to span said opening and engage said seal seating surfaces and being of breadth such that the edge portions of adjoining leaf members contact to form a substantially continuous seal member, means carried by said adjoining leaf members operative to interlock them together, said means including a tab with an enlarged head on alternate leaf members with the remaining leaf members having openings therein to interlock with said tabs, said seal member having a plurality of holes therethrough, and a support means carried by said wall means comprising a plurality of projections extending through said holes to mount said seal member for sliding movement into engagement with said seating surfaces responsive to the fluid pressure on opposite sides of the wall.

References Cited in the file of this patent
UNITED STATES PATENTS

| | | |
|---|---|---|
| 2,811,379 | Hemsworth | Oct. 29, 1957 |
| 2,882,679 | Karcher et al. | Apr. 21, 1959 |